(12) United States Patent
Speldrich

(10) Patent No.: US 8,286,506 B2
(45) Date of Patent: *Oct. 16, 2012

(54) AIR FLOW SENSOR WITH LOW-PRESSURE DROP

(75) Inventor: Jamie W. Speldrich, Freeport, IN (US)

(73) Assignee: Honeywell International Inc., Morristown, NJ (US)

( * ) Notice: Subject to any disclaimer, the term of this patent is extended or adjusted under 35 U.S.C. 154(b) by 334 days.

This patent is subject to a terminal disclaimer.

(21) Appl. No.: 12/685,862

(22) Filed: Jan. 12, 2010

(65) Prior Publication Data

US 2010/0101332 A1    Apr. 29, 2010

Related U.S. Application Data

(63) Continuation of application No. 11/948,317, filed on Nov. 30, 2007, now Pat. No. 7,654,157.

(51) Int. Cl.
*G01F 1/46* (2006.01)
(52) U.S. Cl. .................................. 73/861.65
(58) Field of Classification Search .................. None
See application file for complete search history.

(56) References Cited

U.S. PATENT DOCUMENTS

| | | | |
|---|---|---|---|
| 790,888 A | 5/1905 | Ferris | |
| 2,746,296 A | 5/1956 | Stover | |
| 3,410,287 A | 11/1968 | Van Der Heyden et al. | |
| 3,559,482 A | 2/1971 | Baker et al. | |
| 3,785,206 A | 1/1974 | Benson et al. | |
| 3,838,598 A | 10/1974 | Tompkins | |
| 3,895,531 A | 7/1975 | Lambert | |
| 3,952,577 A | 4/1976 | Hayes et al. | |
| 4,343,194 A | 8/1982 | Dehart et al. | |
| 4,444,060 A | 4/1984 | Yamamoto | |
| 4,481,828 A | 11/1984 | Cheng | |
| 4,546,655 A | 10/1985 | Victor | |
| 4,581,945 A | 4/1986 | Rusz | |
| 4,668,102 A | 5/1987 | Mott | |
| 4,677,858 A | 7/1987 | Ohnhaus | |
| 4,696,194 A | 9/1987 | Taylor | |

(Continued)

FOREIGN PATENT DOCUMENTS

EP    0255056    2/1988

(Continued)

OTHER PUBLICATIONS

Search Report for Corresponding Application No. 08857429.8-2209/2223055 Dated Dec. 20, 2011.

*Primary Examiner* — Harshad R Patel
(74) *Attorney, Agent, or Firm* — Seager, Tufte & Wickhem LLC.

(57) ABSTRACT

An airflow sensor apparatus for measuring flow rate includes a pitot tube with a bypass channel wherein the pitot tube extends halfway into a flow channel in order to reduce a pressure drop. One or more upstream taps can be spaced along the pitot tube facing into a direction of a flow stream which directs the flow to the bypass channel. At least one or more downstream taps can be located to face perpendicular to the direction of flow, such that the fluid after passing over a flow sensor passes through the downstream tap(s). The upstream tap senses stagnation pressure and the downstream tap senses static pressure which is exerted in all directions in the flow channel in order to determine a velocity pressure based on a difference between pressures.

21 Claims, 5 Drawing Sheets

U.S. PATENT DOCUMENTS

| | | | |
|---|---|---|---|
| 4,768,386 A | 9/1988 | Taddeo | |
| 4,825,704 A | 5/1989 | Aoshima et al. | |
| 4,959,990 A | 10/1990 | Morris | |
| 5,000,478 A | 3/1991 | Kerastas | |
| 5,088,332 A | 2/1992 | Merilainen et al. | |
| 5,379,650 A | 1/1995 | Kofoed et al. | |
| 5,481,925 A | 1/1996 | Woodbury | |
| 5,535,633 A | 7/1996 | Kofoed et al. | |
| 5,735,267 A | 4/1998 | Tobia | |
| 5,736,651 A | 4/1998 | Bowers | |
| 5,789,660 A | 8/1998 | Kofoed et al. | |
| 5,817,950 A | 10/1998 | Wiklund et al. | |
| 5,861,561 A | 1/1999 | Van Cleve et al. | |
| 6,044,716 A | 4/2000 | Yamamoto | |
| 6,119,730 A | 9/2000 | McMillan | |
| 6,164,143 A | 12/2000 | Evans | |
| 6,312,389 B1 | 11/2001 | Kofoed et al. | |
| 6,527,835 B1 | 3/2003 | Manginell et al. | |
| 6,543,449 B1 | 4/2003 | Woodring et al. | |
| 6,655,207 B1 | 12/2003 | Speldrich et al. | |
| 6,761,165 B2 | 7/2004 | Strickland, Jr. | |
| 6,769,299 B2 | 8/2004 | Förster et al. | |
| 6,901,795 B2 | 6/2005 | Naguib et al. | |
| 6,904,799 B2 | 6/2005 | Cohen et al. | |
| 6,957,586 B2 | 10/2005 | Sprague | |
| 7,000,612 B2 | 2/2006 | Jafari et al. | |
| 7,041,757 B2 | 5/2006 | Hall et al. | |
| 7,059,184 B2 | 6/2006 | Kanouda et al. | |
| 7,258,003 B2 | 8/2007 | Padmanabhan et al. | |
| 7,337,677 B2 | 3/2008 | Mizohata | |
| 7,343,823 B2 | 3/2008 | Speldrich | |
| 7,654,157 B2 | 2/2010 | Speldrich | |
| 2003/0062045 A1 | 4/2003 | Woodring et al. | |
| 2005/0016534 A1 | 1/2005 | Ost | |

FOREIGN PATENT DOCUMENTS

| | | |
|---|---|---|
| WO | 9221940 | 12/1992 |
| WO | 2007095528 A1 | 8/2007 |

AIR FLOW SENSOR WITH LOW-PRESSURE DROP

This application is a continuation of U.S. patent application Ser. No. 11/948,317, filed Nov. 30, 2007, now U.S. Pat. No. 7,654,157 and entitled "Airflow Sensor with Pitot Tube For Pressure Drop Reduction", which is incorporated herein by reference.

TECHNICAL FIELD

Embodiments are generally related to sensor methods and systems. Embodiments are also related to airflow sensors for medical ventilator applications. Embodiments are additionally related to airflow sensors with ultra low-pressure drop.

BACKGROUND OF THE INVENTION

Flow rate control mechanisms are used in a variety of flow systems as a means for controlling the amount of fluid, gaseous or liquid, traveling through the system. The flow control mechanisms can be utilized to regulate flow rates in systems such as ventilators and respirators where, for example, it may be desirable to maintain a sufficient flow of breathable air or provide sufficient anesthetizing gas to a patient in preparation for surgery.

MEMS based flow sensors can be utilized for measuring such flow rates in a variety of commercial, industrial and medical applications. In medical applications, for example, it is often required to accurately measure the flow rates of fluids introduced intravenously to medical patients and thereby control the flow rate of such fluids. In such applications, flow control is an inherent aspect of proper operation, which can be achieved in part by utilizing the flow sensors to measure the flow rate of fluid within the flow system.

Ventilators are medical devices for delivering a breathing gas to a patient. Usually, ventilators employed in hospital critical care units provide a supply of air enriched with oxygen for inspiration by the patient, and may conventionally include controls for either assisting or controlling breathing, exhaled volume indicators, alarms systems, positive end expiratory pressure valves, pressure indicators, gas concentration monitors, flow indicators, and heated humidifiers for warming and humidifying the breathing gas. Ventilators used in home care are often used to treat obstructive sleep apnea and supply positive air pressure to assist breathing. Manufacturers of medical ventilator equipment require an ultra low pressure drop to insure efficient blower operations The majority of prior art airflow sensors utilized for medical ventilators operate on a principle of a flow restrictor, traversing the air stream and measuring the pressure at a number of locations in the duct. The static pressure drives a sample of airflow through a bypass channel where the flow rate is measured.

An alternate technology uses a pitot tube having a probe with an open tip, which is inserted, into the flow field in order to measure a static pressure. The static pressure is an increasing, continuous function of the airflow rate within the tube. The pitot tube extends completely through the main channel of the sensor therefore presents a barrier to the oncoming flow. The problem associated with these sensors is that the sensor itself is responsible for a certain amount of turbulence in the flow channel Sensor-generated turbulence causes an increase in pressure drop across the sensor as well as noise in the duct system.

Based on the foregoing it is believed that a need exists for an improved airflow sensor that reduces pressure drop and that is adapted to reduce obstruction to the flow. It is believed that the improved flow sensor disclosed herein can address these and other continuing needs.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for improved sensor methods and systems, It is another aspect of the present invention to provide for improved airflow sensor with low-pressure drop.

The aforementioned aspects and other objectives and advantages can now be achieved as described herein. An airflow sensor apparatus for measuring flow rate includes a pitot tube with a bypass channel wherein the pitot tube extends halfway into a flow channel in order to reduce a pressure drop. One or more upstream taps can be spaced along the pitot tube facing into a direction of a flow stream which directs the flow to the bypass channel. At least one or more downstream taps can be located to face perpendicular to the direction of the flow, such that the fluid after passing over a flow sensor passes through the downstream tap(s). The upstream tap senses stagnation pressure and the down stream tap senses static pressure which is exerted in all directions in the flow channel in order to determine a velocity pressure based on a difference between pressures.

The upstream taps and the downstream taps average the pressure in the bypass channel in order to provide a more accurate reading of the flow in the flow channel. The pitot tube extends halfway into the flow channel hence the obstruction to the flow channel and the pressure drop can be reduced. In addition, this technique of sensing velocity pressure eliminates the need to add pressure drop to the system to measure flow such as with a flow restrictor or orifice. The velocity pressure can be sensed electronically utilizing the flow sensor or ultra low-pressure sensor. The orientation of the upstream taps and the downstream taps in this configuration produces the difference between stagnation pressure and drag pressure, which can be correlated to the flow of the fluid.

BRIEF DESCRIPTION OF THE DRAWINGS

The accompanying figures, in which like reference numerals refer to identical or functionally similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
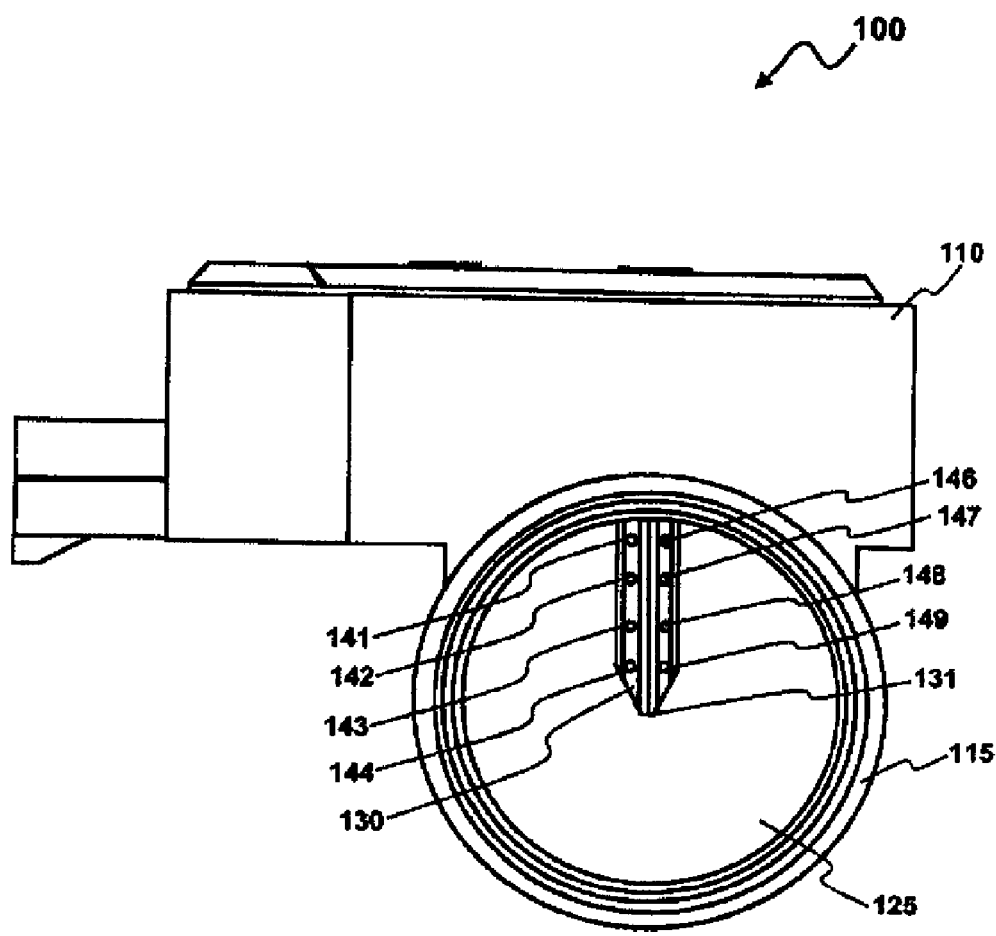
FIG. 1 illustrates a perspective view of an airflow sensor apparatus, which can be adapted for use in implementing a preferred embodiment.

Referring to FIG. 1 a perspective view of an airflow sensor apparatus 100 is illustrated, in accordance with a preferred embodiment. The airflow sensor apparatus 100 includes a housing 110 defining a flow channel 125 into which an entering fluid may flow from a flow system. Note that as utilized herein the term "fluid" can refer to a liquid or a gas. The flow channel 125 can be defined by a flow channel wall 115. The flow channel 125 preferably has a cross-sectional shape and size compatible with that of existing flow systems, such as to fit conical connector as used in ventilators and respirators. A pitot tube 130 extends halfway into the flow channel 125. The pitot tube 130 includes one or more upstream taps 141, 142, 143, 144, 146, 147, 148 and 149 shaped with a circular cross-sectional shape that can be oriented upstream in flow channel 125 to face into the direction of fluid (e.g., gas) flow.

The taps 141, 142, 143, 144, 146, 147, 148 and 149 can be implemented as upstream taps that face into the flow of fluid. As utilized herein, the term "tap" can refer to a small opening that permits flow of a liquid or gas. The pitot tube 130 additionally includes one or more downstream taps (not shown) that face perpendicular to the fluid flow or opposite the direction of the flow. The downstream taps function as exhaust taps for the bypass channel.

Figure 2:
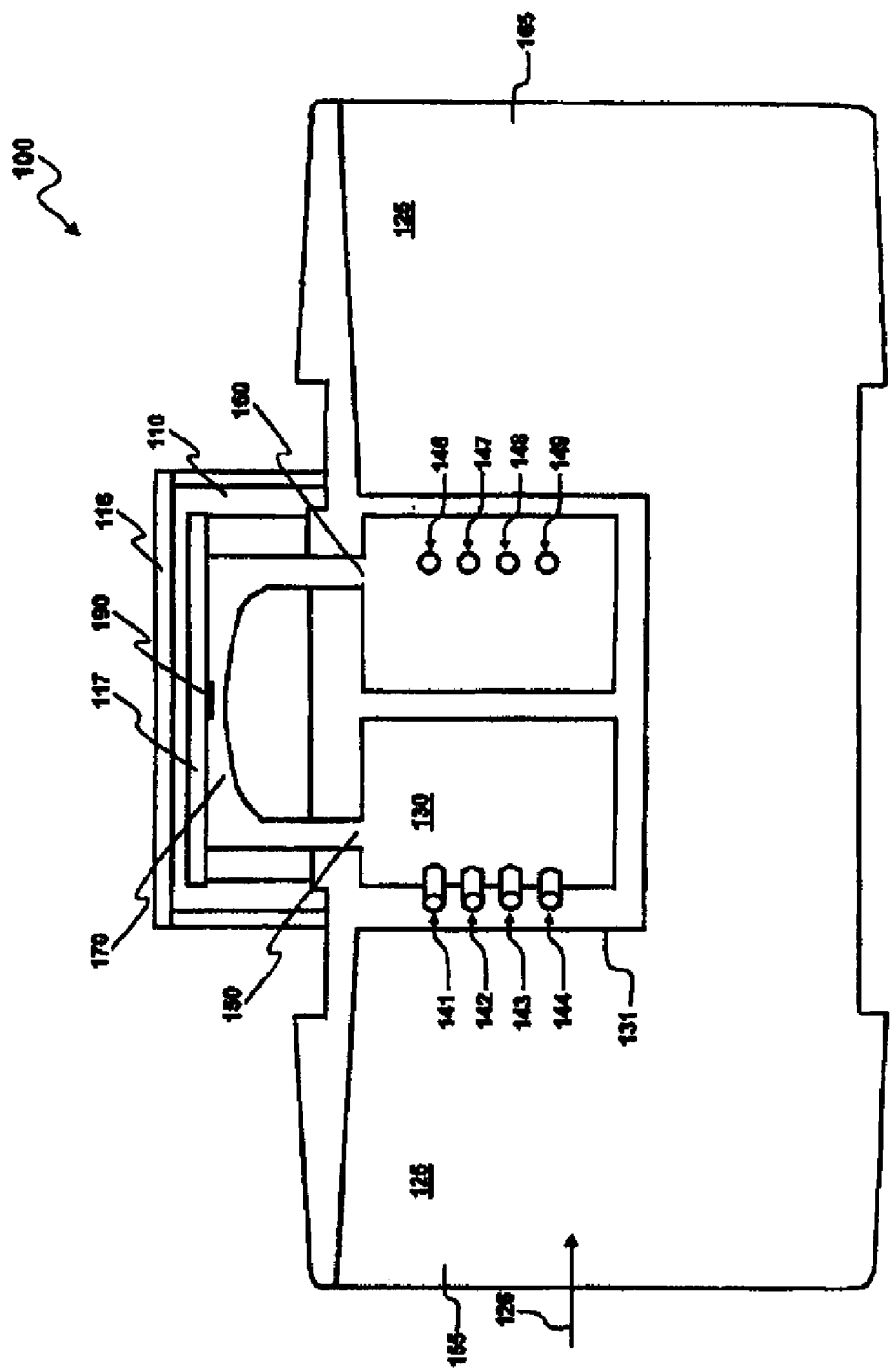
FIG. 2 illustrates a cut-away sectional view of the airflow sensor apparatus, in accordance with a preferred embodiment.

Referring to FIG. 2 a cut-away sectional view of the airflow sensor apparatus 100 shown in FIG. 1 is illustrated, in accordance with a preferred embodiment. The fluid can pass through the flow channel 125 in the direction as indicated by arrow 126 via an inlet end 155, with the fluid exiting the flow channel 125 at an outlet end 165. A flow sensor die 190 is disposed in a bypass-sensing channel 170 parallel to the flow channel 125. The sensor die 190 and the flow channel 125 are located adjacent which is protected by a cover 116, which in turn is situated within a housing 110. A cover 116, disposed against the rear side of the substrate 117 opposite the sensor die 190 protects the sensor die 190 from environmental effects.

The pitot tube 130 is disposed in the flow channel 125 and aligned perpendicular to the flow channel 125. The pitot tube 130 has a leading edge 131 and is preferably sharpened as seen in FIG. 1 such that the fluid smoothly enters the tube 130 thus minimizing or substantially reducing turbulence and droplet shear. The pitot tube 130 extends halfway into the flow channel which reduces pressure drop and obstruction to flow. The upstream taps 141, 142, 143 and 144 in the pitot tube 130 leads to the upstream low resistance flow channel or port 150, which can direct bypass flow to the sense die 190. After passing over the sense die 190, the bypass flow of fluid continues in a downstream low resistance flow path or port 160, and exhausts through downstream taps 146, 147, 148 and 149, which are oriented opposite the direction of flow.

The fluid flows through the flow channel 125 in the direction indicated by arrow 126, a portion of the fluid flows through the upstream taps 141, 142, 143 and 144 in the pitot tube 130 to the bypass channel 170 so that the flow sensor die 190 can measure the flow rate of the fluid in the flow channel 125 indirectly without being exposed to the damage or fluctuating conditions existing in typical flow channels.

Figure 3:
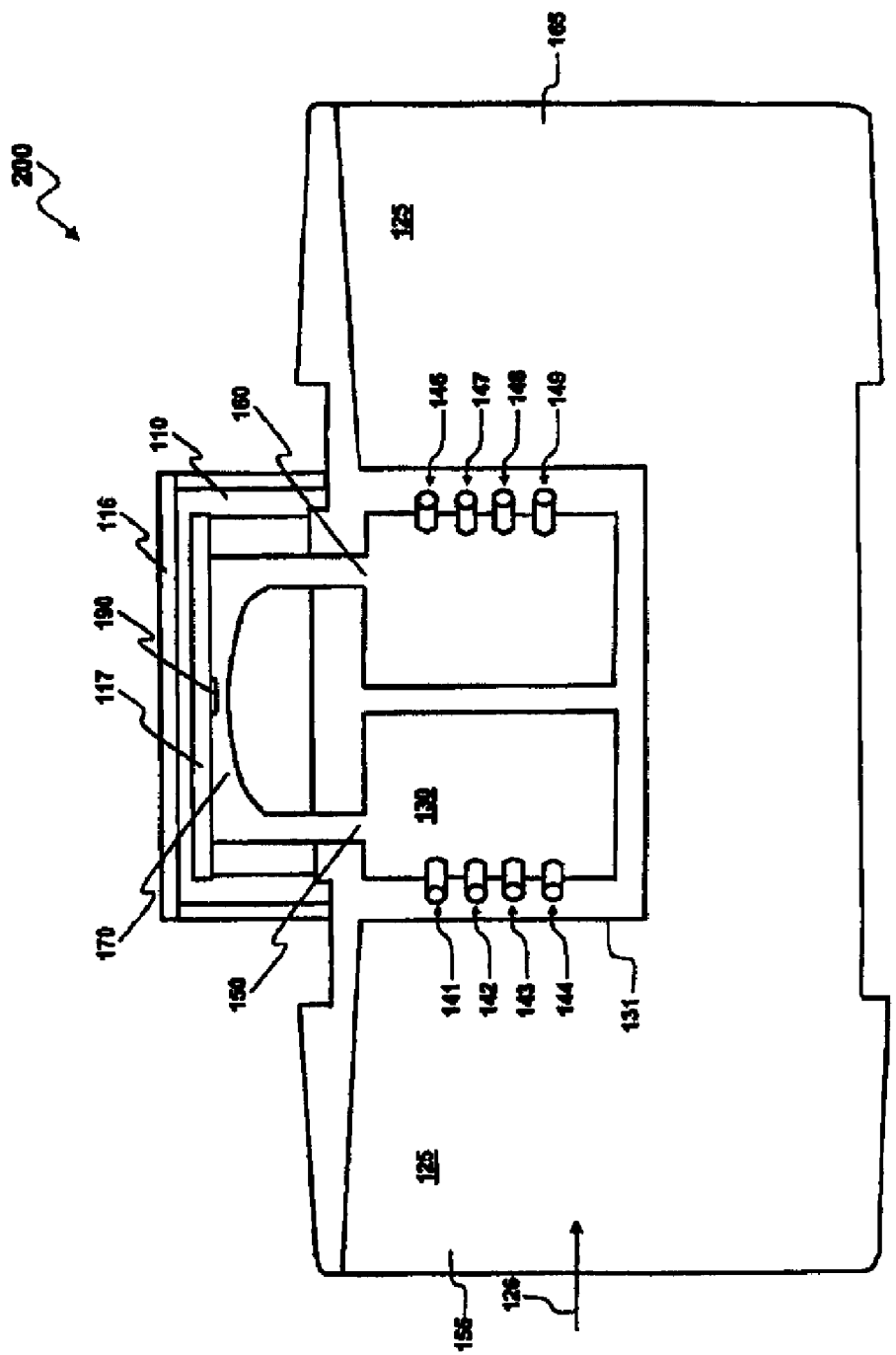
FIG. 3 illustrates a cross sectional view of an airflow sensor, in accordance with a preferred embodiment.

Referring to FIG. 3, a cut-away sectional view of the airflow sensor apparatus 200 is illustrated wherein downstream taps 146, 147, 148 and 149 are shown oriented away from the flow direction.

Figure 4:
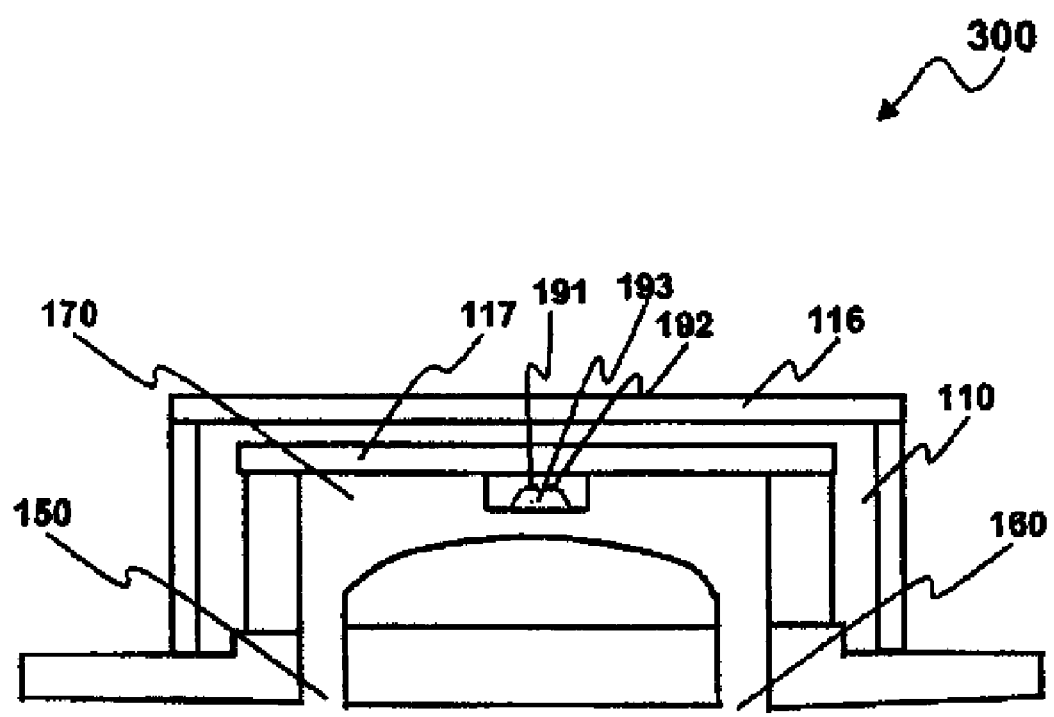
FIG. 4 illustrates a cross sectional view of an airflow sensor, in accordance with a preferred embodiment.

Referring to FIG. 4 a cross sectional view of an airflow sensor 300 is illustrated, in accordance with a preferred embodiment. The sensor 300 includes an upstream sensing element 191, a downstream sensing element 192 and a central heating element 193. The heating element 193 and sensing elements 191 and 192 comprises of resistive thin films (not shown), which comprise an electrical bridge whose output is analogous to the differential pressure applied to the sensor apparatus 100 illustrated in FIGS. 1-2. The sensing elements 191 and 192 can be implemented as, for example, a MEMS type airflow sensor. It can be appreciated, of course, that the sensing elements 191 and 192, may be configured in the context of other types of sensor designs, not merely MEMS-type configurations. The fluid will flow across the upstream sensing element 191, the downstream sensing element 192 and the heating element 193. Under no flow conditions, the upstream sensing element 191 and the downstream sensing element 192 would both read the same temperature due to the heating element 193, i.e., both sensors would have the same measured resistance values.

As the fluid enters the upstream port 150 of the pitot tube 130, the upstream sensing element 191 senses the average sensor impact pressure of flowing fluid to establish a high pressure value resulting in a reduction of temperature. The downstream sensing element 192 senses low pressure, which forms in downstream port 160 of the bypass channel 170 resulting in an increase of temperature. The change in temperatures produces a corresponding change in the resistance values of the sensor 300. The sensor 300 transforms the respective high and low fluid pressures into an electrical signal whose character is a function of the differential pressure (DP), that is the difference between the sensed high and low fluid pressures. Upstream taps 141, 142, 143 and 144 and the downstream taps 146, 147, 148 and 149, such as those illustrated in FIGS. 2-3, can average the pressure in the bypass channel 170 in order to provide a more accurate reading of the flow in the flow channel 125.

Note that as utilized herein the acronym "MEMS" refers generally to term "Micro-Electro-Mechanical Systems". MEMS devices refer to mechanical components on the micrometer size and include 3D lithographic features of various geometries. They are typically manufactured using planar processing similar to semiconductor processes such as surface micromachining and/or bulk micromachining. These devices generally range in size from a micrometer (a millionth of a meter) to a millimeter (thousandth of a meter). At these size scales, a human's intuitive sense of physics do not always hold true. Due to MEMS' large surface area to volume ratio, surface effects such as electrostatics and wetting dominate volume effects such as inertia or thermal mass.

MEMS devices can be fabricated using modified silicon fabrication technology (used to make electronics), molding and plating, wet etching (KOH, TMAH) and dry etching (RiE and DRIE), electro discharge machining (EDM), and other technologies capable of manufacturing very small devices. MEMS sometimes go by the names micromechanics, micro machines, or micro system technology (MST). While the inserted position of the sensor shown in FIGS. 1-3 are preferred for the illustrated design of pitot tube 130, other configurations are possible and may even be favored for pitot tubes of different design and configuration.

Figure 5:
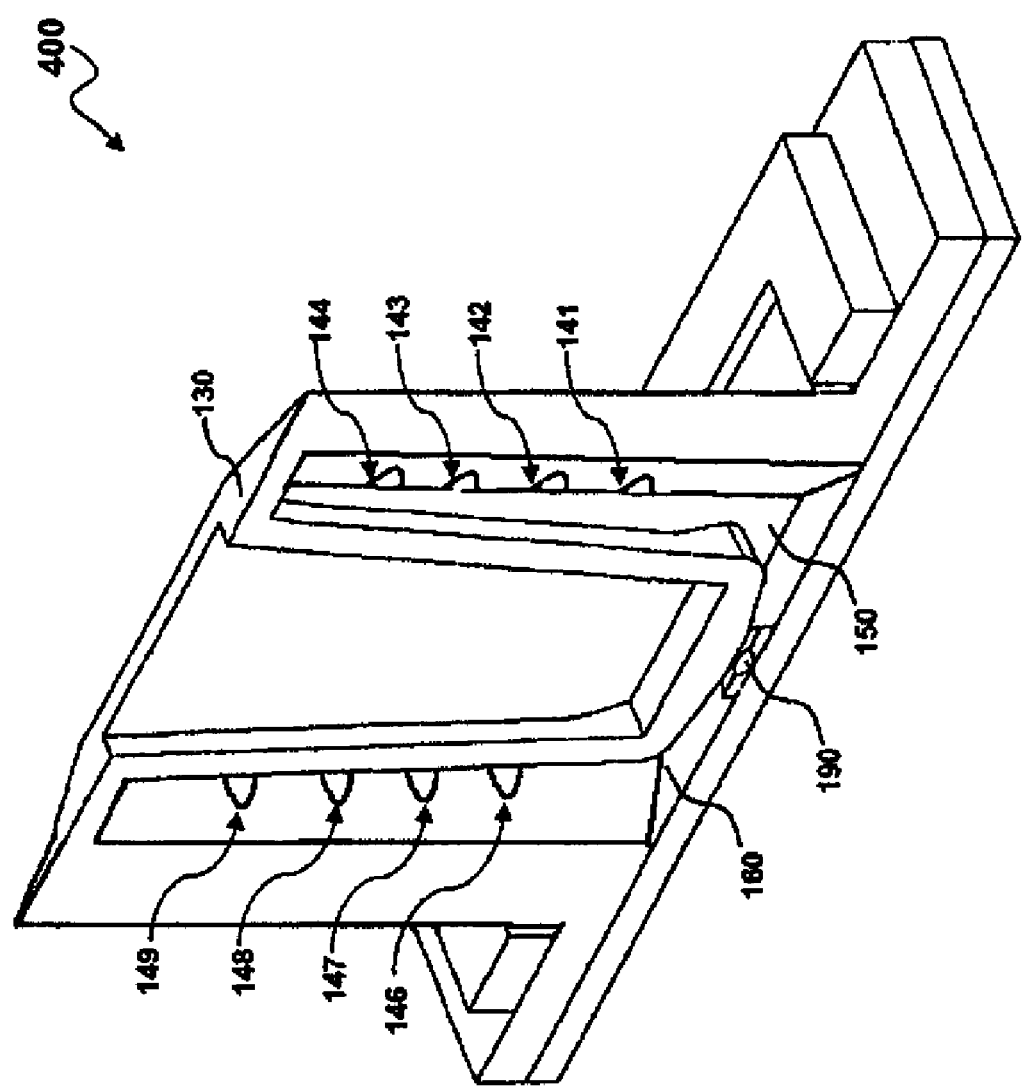
FIG. 5 illustrates a cut-away sectional view of an exemplary airflow sensor apparatus, in accordance with a preferred embodiment.

Referring to FIG. 5 cut-away sectional view of the airflow sensor apparatus 400 is illustrated, in accordance with an alternative, but preferred embodiment. Note that in FIGS. 1-4, identical or similar parts or elements are generally indicated by identical reference numerals. The design of apparatus 400 thus includes one or more upstream taps 141, 142, 143 and 144, which face into the flow direction 126 as shown in FIG. 2 that is to be measured. The upstream taps 141, 142, 143 and 144 can direct the flow of fluid to the sensor die 190 (e.g., MEMS sensor). The sensor die 190 and the bypass channel 170 are located adjacent a housing 110.

The pitot tube 130 upstream taps 141, 142, 143 and 144 creates a pressure drop across the upstream port 150 and down stream port 160 of the bypass channel 170 which facilitates fluid flow into the bypass channel 170. This pressure drop, or pressure differential, is dependent on pitot tube 130 geometry and increases with flow rate. Furthermore, the fluid in the flow channel 125 will have an increasingly turbulent flow as the flow rate of the fluid increases, i.e., an increasing non-uniform pressure and velocity across a given plane orthogonal to the direction of flow. In response, by reducing the pitot tube 130 to half of the flow channel 125 reduces pressure drop, straightens and luminaries the flow in the flow channel 125, thereby reducing turbulence. The pitot tube 130 reduces turbulence by forcing the fluid to flow through other half of the flow channel 125. The pitot tube 130 can incorporate an up and/or downstream flow straightener(s) (131) protruding into the flow to enhance flow stability.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A flow sensor apparatus for measuring a property related to fluid flow through a flow channel, the flow channel defined by flow channel walls, comprising:
    a housing having at least a portion that extends from a flow channel wall and into the flow channel but substantially less than all the way across the flow channel terminating at a housing distal end, whereby the housing distal end is spaced a distance from the flow channel wall;
    the housing defining a bypass channel;
    the portion of the housing that extends into the flow channel having at least one upstream tap fluidly coupled to an upstream port of said bypass channel, and at least one downstream tap fluidly coupled to a downstream port of said bypass channel;
    a flow sensor; and
    the bypass channel is configured to direct fluid from said at least one upstream tap, to the flow sensor, and then to the at least one downstream tap, wherein the flow sensor is configured to provides a measure related to the fluid flow through the flow channel.

2. The flow sensor apparatus of claim 1, wherein said flow sensor comprises an upstream sensing element, a downstream sensing element and a heating element between the upstream sensing element and the downstream sensing element.

3. The flow sensor apparatus of claim 1 wherein the portion of the housing that extends into the flow channel extends about halfway across the flow channel.

4. The flow sensor apparatus of claim 1 wherein the portion of the housing that extends into the flow channel has a tapered leading edge for reducing turbulence in the flow channel.

5. The flow sensor apparatus of claim 1 wherein the portion of the housing that extends into the flow channel has a tapered trailing edge for reducing turbulence in the flow channel.

6. The flow sensor apparatus of claim 1 wherein the portion of the housing that extends into the flow channel has an upstream flow straightener extending a distance upstream of the at least one upstream tap.

7. The flow sensor apparatus of claim 1 wherein the portion of the housing that extends into the flow channel has a downstream flow straightener extending a distance downstream of the at least one downstream tap.

8. The flow sensor apparatus of claim 1 wherein the portion of the housing that extends into the flow channel has two or more upstream taps fluidly coupled to the upstream port of said bypass channel.

9. The flow sensor apparatus of claim 1 wherein the portion of the housing that extends into the flow channel has two or more downstream taps fluidly coupled to the downstream port of said bypass channel.

10. A flow sensor apparatus for measuring a property related to fluid flow through a flow channel defined by flow channel walls, comprising:
    a housing having at least a portion that extends into the flow channel but substantially less than all the way across the flow channel, the housing defining a bypass channel;
    the portion of the housing that extends into the flow channel having at least one upstream tap facing substantially into the direction of fluid flow passing through said flow channel, the at least one upstream tap functioning as an upstream port for said bypass channel;
    the portion of the housing that extends into the flow channel further having at least one downstream tap facing substantially away from the direction of fluid flow passing through said flow channel, the at least one downstream tap functioning as a downstream port for said bypass channel; and
    the bypass channel is configured to direct said fluid from said upstream port, to a flow sensor, and finally to the at least one downstream tap.

11. The flow sensor apparatus of claim 10, wherein said flow sensor comprises an upstream sensing element, a downstream sensing element and a heating element between the upstream sensing element and the downstream sensing element.

12. The flow sensor apparatus of claim 10 wherein the portion of the housing that extends into the flow channel extends about halfway across the flow channel.

13. The flow sensor apparatus of claim 10 wherein the portion of the housing that extends into the flow channel has a tapered leading edge for reducing turbulence in the flow channel.

14. The flow sensor apparatus of claim 10 wherein the portion of the housing that extends into the flow channel has a tapered trailing edge for reducing turbulence in the flow channel.

15. The flow sensor apparatus of claim 10 wherein the portion of the housing that extends into the flow channel has an upstream flow straightener extending a distance upstream of the at least one upstream tap.

16. The flow sensor apparatus of claim 10 wherein the portion of the housing that extends into the flow channel has a downstream flow straightener extending a distance downstream of the at least one downstream tap.

17. The flow sensor apparatus of claim 10 wherein the portion of the housing that extends into the flow channel has two or more upstream taps spaced apart from one another and fluidly coupled to the upstream port of said bypass channel.

18. The flow sensor apparatus of claim 10 wherein the portion of the housing that extends into the flow channel has two or more downstream taps spaced apart from one another and fluidly coupled to the downstream port of said bypass channel.

19. A flow sensor apparatus, comprising:
- a housing including a wall defining a bypass channel through which fluid is enabled to flow, said housing extending into but substantially less than all the way across a width dimension of a flow channel;
- at least two upstream taps spaced apart along said housing in the flow channel, the at least two upstream taps collectively functioning as an upstream port for said bypass channel;
- at least two downstream taps spaced apart along said housing, the at least two downstream taps collectively functioning as a downstream port for said bypass channel; and the bypass channel is configured to direct fluid from the flow channel, through the at least two upstream taps, to a flow sensor, and back to the flow channel through the at least two downstream taps of the housing.

20. The flow sensor apparatus of claim 19, wherein said housing includes an inlet end and an outlet end that are configured for coupling the flow sensor apparatus to a flow system.

21. The flow sensor apparatus of claim 19, wherein said flow sensor comprises an upstream sensing element, a downstream sensing element and a heating element between the upstream sensing element and the downstream sensing element.

* * * * *